United States Patent [19]

Kanai

[11] Patent Number: 4,530,585
[45] Date of Patent: Jul. 23, 1985

[54] AUTOMATIC STROBE APPARATUS

[75] Inventor: Masaharu Kanai, Tokyo, Japan

[73] Assignee: Fuji Photo Film Co., Ltd., Kanagawa, Japan

[21] Appl. No.: 541,077

[22] Filed: Oct. 7, 1983

[30] Foreign Application Priority Data

Oct. 8, 1982 [JP] Japan .................. 57-176233

[51] Int. Cl.$^3$ ............................................. G03B 15/05
[52] U.S. Cl. ................................... 354/416; 315/149
[58] Field of Search ............... 315/149, 151; 354/413, 354/414, 416, 417

[56] References Cited

U.S. PATENT DOCUMENTS

| 3,591,829 | 7/1971 | Murata | 315/151 |
|---|---|---|---|
| 4,192,587 | 3/1980 | La Racque et al. | 354/414 |
| 4,194,818 | 3/1980 | Matteson et al. | 354/417 |
| 4,317,620 | 3/1982 | Coppa et al. | 354/414 |
| 4,331,400 | 5/1982 | Brownstein et al. | 354/414 |

Primary Examiner—L. T. Hix
Assistant Examiner—David M. Gray
Attorney, Agent, or Firm—Young & Thompson

[57] ABSTRACT

An automatic strobe apparatus for use with a diaphragm-shutter of the type having a programmed mode of operation operates to automatically control the amount of light provided therefrom. The automatic strobe apparatus provides the maintained proportion of illumination light contributing to film exposure under conditions of the level of ambient scene illumination light intensity higher than the first level for the maximum exposure interval allowable for an exposure without incurring blurring effects from camera shake and under conditions of the level of ambient scene illumination light intensity lower than the second level for substantially no proportion of ambient scene illumination light contributing to film exposure when the maximum exposure interval is given. On the other hand, the automatic strobe apparatus provides an increased amount of artificial illumination light for the compensation of the lack of the amount of ambient scene illumination light contributing to film exposure under conditions of the level of ambient scene illumination light intensity between the first and second levels.

6 Claims, 8 Drawing Figures

FIG. I

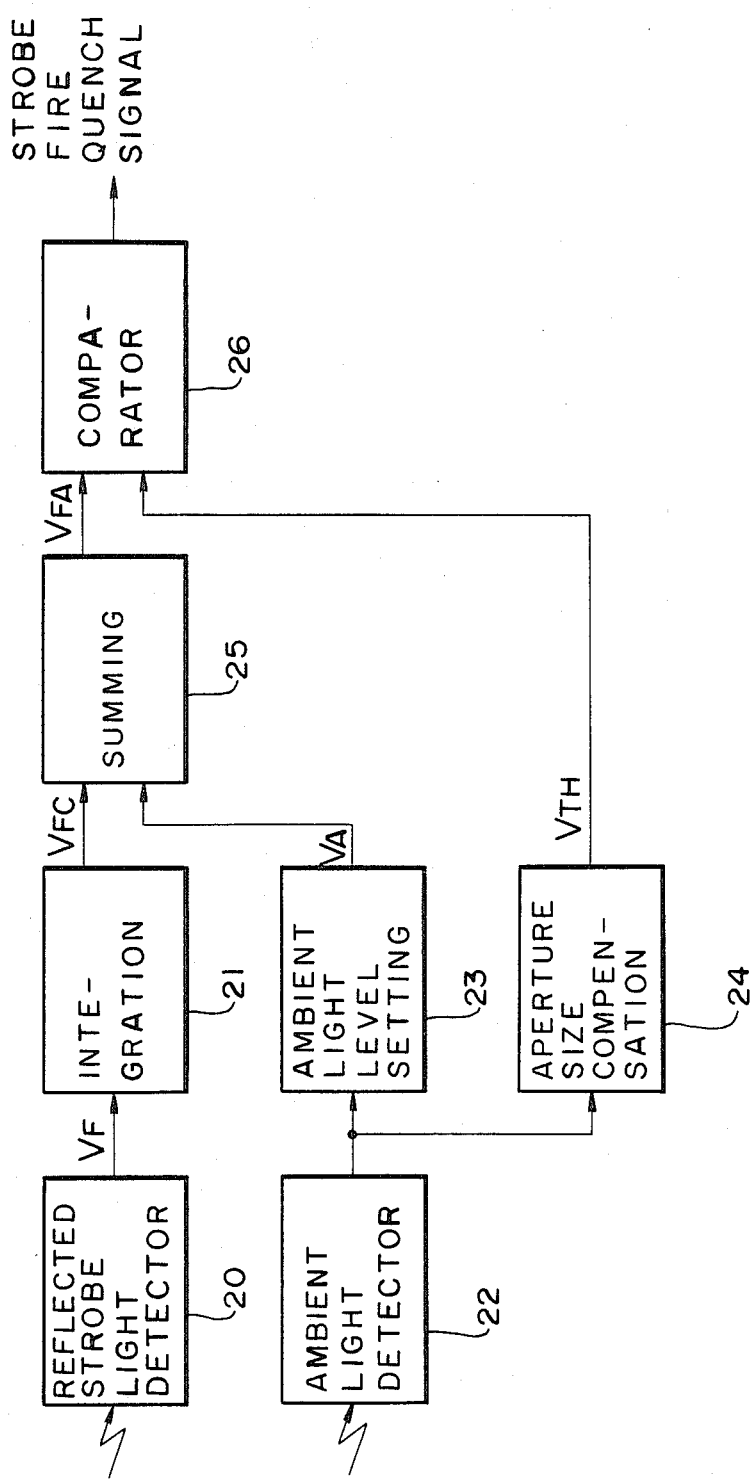

AUTOMATIC STROBE APPARATUS

BACKGROUND OF THE INVENTION

The present invention relates to an automatic strobe apparatus for use with a diaphram-shutter of the type having a programmed operation wherein a selected ratio is, in daylight synchronized flash photography, maintained between proportions of the ambient scene light and the artificial scene light each directly contributive to the film exposure.

In against-the-backlight photography wherein illumination falls on the main subject in a scene from behind, a dissatisfactory-or-under-exposure of the main subject is generally caused regardless of a satisfactory-or proper-exposure of the scene. When applying a daylight synchronized flash photography technique to the aforementioned case, a proper exposure of the backlit subject is caused as well as the proper exposure of the scene because the artificial illumination provided by an electronic flash or strobe falls on and is then reflected by the main subject, resulting in the contribution thereof to the film exposure. On the other hand, when the intensity of ambient scene illumination light existing in the scene to be photographed (which in generally referred to as scene brightness) is relatively low as in indoor photography or outdoor photography in the early morning or late evening the ambient scene illumination light changes in color temperature, resulting in that the ambient scene illumination light differs in color quality from that for which a film is balanced, that is in a worse color reproduction. Even under such conditions, however, it is possible to develop the color reproduction by applying a daylight synchronized flash photography technique because of the strobe light close being in color temperature to the sunlight.

Recently, there has been proposed in Japanese unexamined published Pat. No. 149022/81 a fill-in flash system wherein it is intended to provide artificial illumination light to fill in the photographic subject against a backlit scene every exposure. The patent shows an electronic flash apparatus or system in combination with a specialized flashmatic mechanism which essentially comprises a photo-interrupter operatively associated with a focus adjusting ring for focusing an objective lens and a sensor plate which, in turn, is disposed between interrupter blades for the motion in association with the motion of the blades of the shutter mechanism of the type operated in programmed mode. The electronic flash apparatus is arranged to be fired at the time the aperture of the size determined by the flashmatic mechanism is established, the amount of illumination light provide by the electronic flash being previously determined corresponding to the level of ambient scene illumination light intensity. Under conditions of ambient scene illumination light intensity lower than that where no ambient scene illumination light contributes to the film exposure, the electronic flash is controlled to maintain its maximum amount of illumination light. But, under conditions of ambient scene illumination light intensity between the aforementioned intensity of no contribution of ambient scene illumination light to the film exposure and the intensity which causes the maximum exposure interval allowable for the exposure without incurring any adverse blurring effect from camera shake, the amount of illumination light provided by the electronic flash is varied in inverse proportion to the level of the ambient scene illumination light intensity. Furthermore, under conditions of ambient scene light intensity higher than that for the aforementioned maximum exposure interval, the minimum amount of illumination light from the electronic flash may be maintained, establishing the ratio of 35 percent of artificial illumination light centribution to the film exposure. In this case, the contribution of ambient scene illumination light to the film exposure is maintained in the ratio of 75 percent.

One of the problems associated with cameras utilizing an electronic flash apparatus having the aforementioned specialized flashmatic mechanism for daylight synchronized flash photography is concerned with the particularity in the operation of the shutter mechanism characterized by that, when ambient scene light intensity is relatively high and the subject to be photographed is at a distance, the commencement of the shutter closing operation is caused in advance of attaining its predetermined aperture size in accordance with the distance. The aforementioned particularity in the operation of the shutter mechanism results in an extremely reduced proportion of artificial illumination light contributing to the film exposure because of the fact that the electronic flash is, as in conventional units, fired in synchronism with the commencement of the shutter closing operation in disregard of the insufficiently attained aperture size of the shutter, so that it is dificult to accurately control the electronic flash to provide proportional illumination light. The electronic flash apparatus described above, from a different stand point, has an intricacy due to the provision of both the specialized flashmatic mechanism using a photo-interrupter and means for determining durations of time during which the electronic flash continues to provide illumination light.

OBJECTS OF THE INVENTION

Therefore, it is a primary object of the present invention to provide an automatic strobe apparatus wherein a ratio is maintained between the proportion of the ambient scene light and artificial scene light contributing to film exposure independently of the ambient scene light level and the subject distance.

It is another object of the present invention to provide an automatic strobe apparatus which is simple in construction and which eliminates the requirement of a specialized flashmatic mechanism in cameras.

SUMMARY OF THE INVENTION

To attain the aforementioned objects, the present invention provides an automatic strobe apparatus mainly comprising means for integrating the artificial strobe light reflected from the scene to be photographed and thereby producing a first signal in correspondence therewith, means for producing a second signal in correspondence with the ambient light intensity existing in the scene, means for producing a third signal as a result of summing the first and second signals for the comparison thereof with a fourth signal which is given in dependence on aperture sizes in daylight synchronized flash photography. When the third signal is larger than the fourth, a strobe fire quench signal is produced for the termination of the strobe firing.

According to a preferred embodiment of the present invention, the second signal is steady independently of the level of ambient scene light and the subject distance so as to maintain the proportions of artificial strobe light contributing to film exposure under conditions of the level of ambient scene light higher than the first level for the maximum exposure interval allowable for an exposure without incurring any adverse blurring effect from camera shake and under conditions of the level of ambient scene light lower than the second level for substantially no proportion of ambient scene light contributing to film exposure when the aforementioned maximum exposure interval is maintained. On the other hand, the second signal is variable under conditions of the level of ambient scene light between the first and second level as aforementioned so as to cause the strobe to provide an increased amount of artificial light for the compensation of the lack of the ambient scene light contributing to the film exposure.

BRIEF DESCRIPTION OF THE DRAWINGS

These and other objects and features of the present invention will become apparent from the following description taken in conjunction with the preferred embodiments thereof with reference to the accompanying drawings, in which;

FIG. 3 is a schematic block diagram showing the principal parts of an automatic strobe apparatus of a preferred embodiment of the present invention;

DETAILED DESCRIPTION OF THE INVENTION

Figure 1:
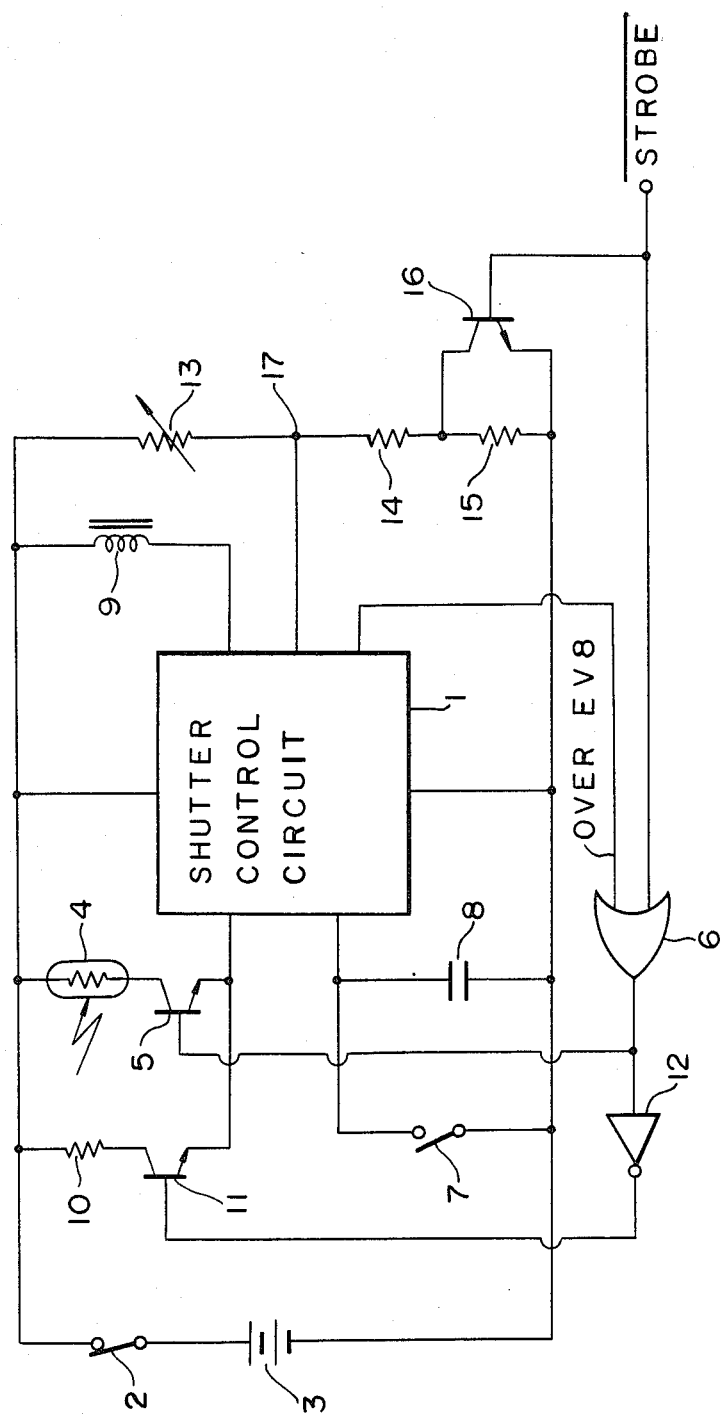
FIG. 1 is a schematic circuit diagram of a shutter control device for use with an automatic strobe apparatus of the present invention.

Referring now to FIG. 1 showing a shutter control device for use with the automatic strobe apparatus of the present invention, the shutter control device includes a shutter control circuit shown generally at 1 which, in turn, is connected in series to a power supply 3 through a power switch 2. Connected in series to a photoresponsive element 4 which photoelectrically responds to light falling thereon, there is provided a transistor 5 which is turned OFF responsive to a low output signal level (L) provided at an output terminal of an OR circuit 6 only under conditions of exposure value less than the exposure value (which is equal to EV8 in this embodiment) for the maximum exposure interval, for example 1/32 sec. allowable for an exposure without incurring any adverse blurring effect from camera shake and using a strobe, and which otherwise is remains conductive. When the transistor 5 is conductive, the depression of a shutter start button (not shown) causes the commencement of opening motion of the diaphragm-shutter, simultaneously opening a normally closed switch 7 so as to charge a capacitor 8 with the photo-electric current through the photoresponsive element 4. When a predetermined voltage is presented across the capacitor 8, an electromagnet 9 is deenergized, causing the shutter to close in a well-known manner.

Connected in parallel across the photo-responsive element 4 and transistor 5, is a resistor 10 and a transistor 11 connected in series to each other which, in turn, cooperatively serve to fix the shutter speed, or the exposure interval, for example, 1/32 sec. which is the maximum interval allowable for an exposure without incurring any adverse blurring effect from camera shake and also provide the diaphragm-shutter with its fully opened aperture when an exposure value less than EV8 is given while using the strobe. For this reason, the output signal from the OR circuit 6 is directed to the base of the transistor 11 after the inversion thereof by an inverter 12.

A variable resistor 13 which is varied in accordance with film speeds is connected in series to series-connected resistors 14 and 15. Connected in parallel across the resistor 15 is a transistor 16 which, in turn, is turned OFF when using the strobe. As is well-known in the art, a signal representing the use of strobe may be provided from a switch which is turned ON in association with either the displacement of the strobe to an operative position or the manual operation thereof for making the strobe operable. Consequently, that the strobe is not in use renders the transistor 16 conductive, presenting a low voltage at a connection denoted by numeral 17. On the other hand, that the strobe is in use renders the transistor 16 OFF, presenting a high voltage at the connection 17. As a result of this, although the film exposure can be properly attained in an automatic exposure mode of operation without using artificial illumination by the strobe, the application of artificial illumination by the strobe results in the film exposure equal to 80 percent of the proper exposure since the same amount of ambient scene light is automatically submitted for the light exposure for any film of different speeds, for example, whether ISO 100 or ISO 125. In such daylight synchronized flash photography, ambient scene illumination light contributing to the film exposure is decreased into some extent, while artificial illumination light is provided in supplementation for at least the decreased amount of ambient scene illumination light. It is of course possible to establish a desirable ratio of the proportions of the exposure attributable to the ambient and artificial scene illumination with due consideration of the capability of the strobe. It will be important for some purposes to select, for example, a ratio of 50 percent of the proportions of both the ambient and artificial scene illumination light contributing to proper film exposure, or a ratio of 100 percent of the ambient scene illumination light and 25 percent of the artificial scene illumination light each contributing to film exposure for causing over-exposure by ⅓ steps. The 100 percent of the ambient scene illumination light to which the proportion of the proper exposure is attributable is attained by omitting the resistor 15 and transistor 16 from the circuit of the shutter control device shown in FIG. 1.

Figure 2:
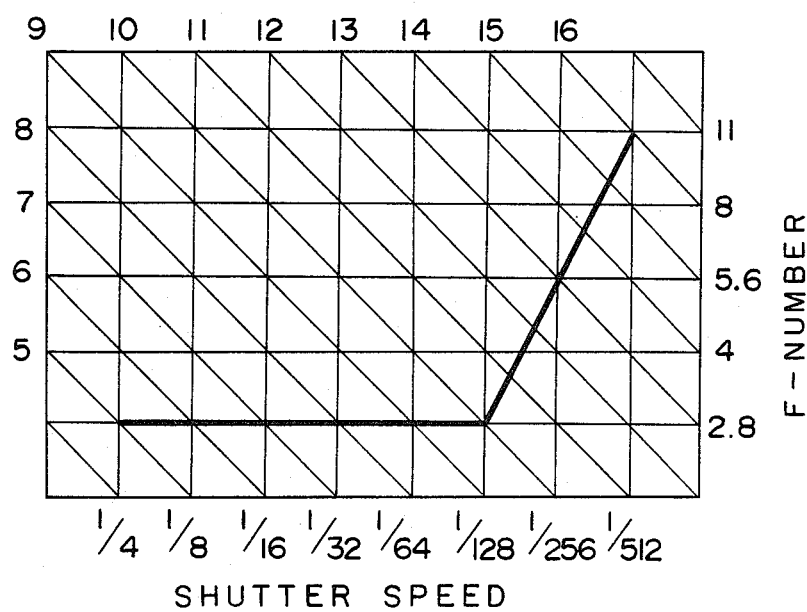
FIG. 2 is a diagram of the programmed operation of the diaphragm-shutter which is controlled by the control device of FIG. 1.

FIG. 2 shows a diagram of a programmed operation of a diaphragm-shutter which serves as diaphragm as well as shutter in a well known manner. Under conditions of exposure value less than EV10, the diaphragm-shutter is fully opened to the largest aperture size to provide the f-number of 2.8 (F 2.8) and is operable at different shutter speeds. While the shutter, under conditions of exposure values more than EV10, is operable at both different f-numbers and different shutter speeds. As mentioned hereinbefore, the condition of the strobe used and exposure values less than EV8 causes the actuation of a limit to maintain the shutter speed constant at 1/32 sec.

Referring now to FIG. 3, there is shown the block diagram for the automatic strobe apparatus embodiment the present invention. A detector 20 for detecting reflected strobe light from the scene to be photographed can operate in synchronism with the firing of a discharge tube and provides an output signal VF having a wave form shown in FIG. 6, the output signal VF being directed to an integration circuit 21 for integration.

Another detector 22, which detects the ambient light intensity, that is scene brightness, existing in the scene to be photographed, provides an output signal which, in turn, is directed to both an ambient light level setting means 23 and aperture size compensation means 24. The ambient light level setting means 23 provides an output signal VA determined according to the ambient light intensity and the other an output signal VTH determined according to aperture sizes shown in FIG. 2.

Summing means 25 provides an output signal VFA as a result of summing the signal VFC and VA. A comparator 26 which compares the size of the output signals VFA and VTH provides a strobe fire quench signal for the termination of the strobe fire when the output signal VFA has grown more than the output signal VTH.

Figure 4:
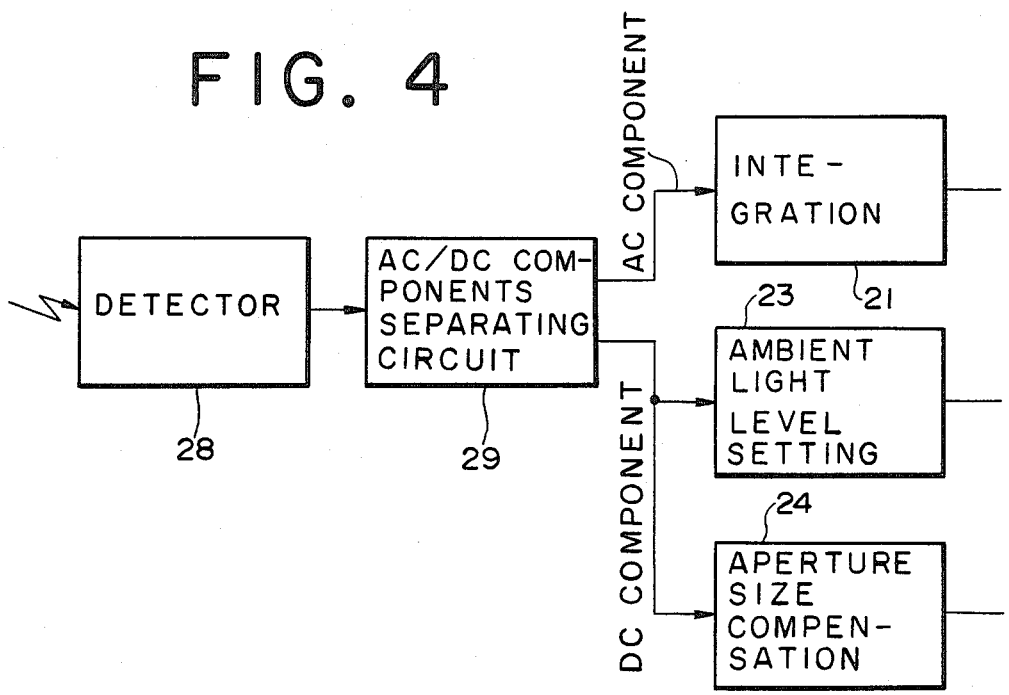
FIG. 4 is a schematic block diagram showing the principal parts of an automatic strobe apparatus of another preferred embodiment of the present invention.

Referring to FIG. 4 showing the block diagram illustrating the automatic atrobe apparatus of another embodiment of the present invention, there is shown at 28 a signal detector for detecting both the ambient light and the reflected strobe light intensity. As is well-known, because of the fact that although ambient light intensity is generally not varied during an exposure, strobe light intensity changes with time, the detector 28 provides on output signal containing AC/DC signal components which, in turn, are directed to an AC/DC component separating circuit 29 for separation into the two components of the signal. The AC component of the signal which represents the reflected strobe light intensity is directed to the integration circuit 21, and, on the other hand, the DC component of the signal which represents the ambient light intensity is directed to both the ambient light level setting means 23 and the aperture size compensation means 24. The respective output signals are processed in much the same way as described in association with the embodiment of FIG. 3.

Figure 5:
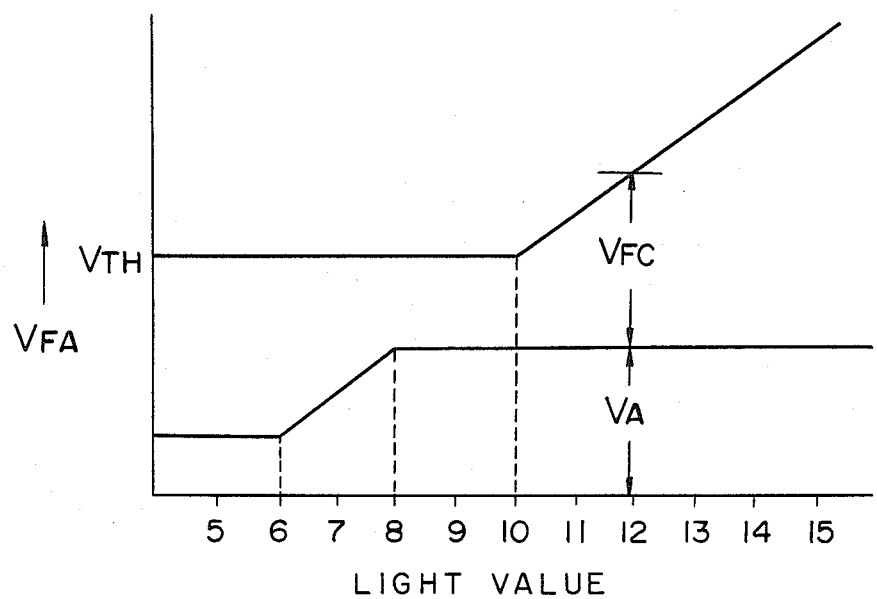
FIG. 5 is a graph of waveform diagrams illustrating the correlation between the signals shown in FIG. 3 wherein the level of ambient scene light is plotted along the abscissa.

As shown in FIG. 5 showing wave forms of the signals of FIG. 3, it is to be understood that the ambient light level setting means 23 provides regardless of ambient light intensity, a fixed value of signal under conditions of ambient light intensity equal to or higher than that, for example BV3 (which gives LV8 for the film speed of ISO 100), for the maximum exposure interval allowable without incurring any adverse blurring effects from camera shake. When the shutter is maintained at a speed providing the aforementioned maximum exposure interval the ambient light level setting means 23 provides another fixed value of signal regardless of ambient light intensity under conditions of ambient light intensities equal to or lower than that, for example BV1 (which gives LV6 for the film speed of ISO 100), where the proportion of ambient light contributing to the exposure of the film becomes substantially zero. However, under conditions of ambient light intensity between BV1 (LV6) and BV3 (LV8), the ambient light level setting means 23 provides a signal which changes in proportion to the intensity of ambient light contributing to the exposure of the film. It should be noted that the proportional change includes nonlinear changes and changes in steps as well as linear changes as shown in the embodiments.

The aperture size compensation means 24 controls the discharge tube of the strobe to change the amount of light emission therefrom in accordance with aperture sizes when the strobe is used. Explaining in association with the diagram shown in FIG. 2, the aperture size compensation means 24 can provide the output signal VTH which has a fixed value under conditions of ambient intensity equal to or lower than BV5 (which gives LV10 for the film speed of ISO 100) and gradually rises in value with the increase of ambient light intensity beyond BV5. When the sum of the signal VA depending on ambient light intensity and the signal VFC on the amount of reflected strobe light becomes equal to the signal VTH depending on aperture size, the comparator 26 provides a strobe fire quench signal which operates to quench the discharge tube.

Figure 6:
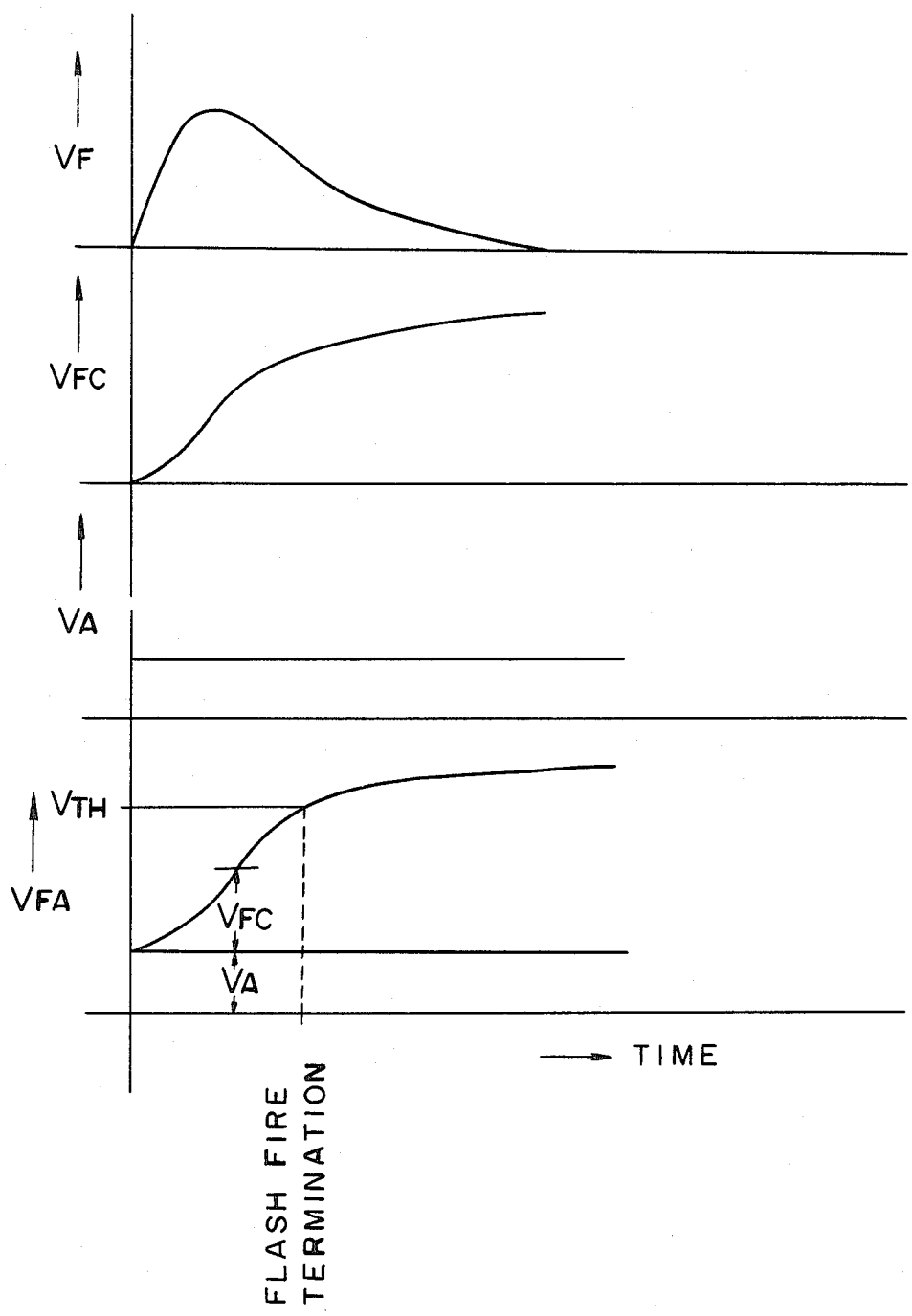
FIG. 6 is a group of waveform diagrams illustrating the correlation betwen the signals shown in FIG. 3 under a condition of ambient scene light level, wherein time is plotted along the ordinate.

Referring to FIG. 6 there are shown the wave forms of the signals VF, VFC, VA and VFA in a daylight synchronized flash photography under a certain condition of ambient light intensity. As is apparent therefrom, the signal VFA from the summing means 25 rises with time, while the signal VTH from the aperture size compensation 24 is maintained constant. As the signal VFA rises higher than the signal VTH, the strobe fire is terminated.

Figure 7:
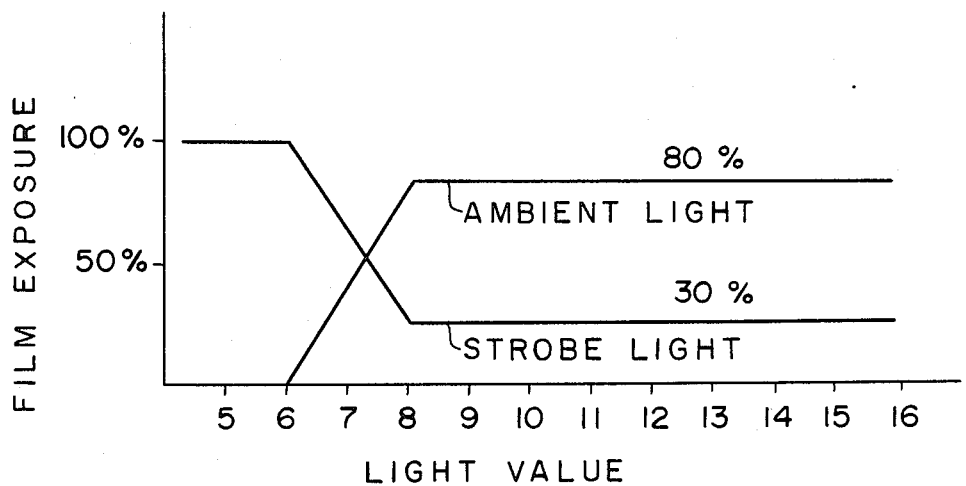
FIG. 7 is a graph showing the proportions of the ambient scene light and the artificial strobe light contributing to the film exposure.

In FIG. 7 there is shown graphically the percentage contribution of the film exposure which is attributable to ambient scene light and artificial strobe light. Under conditions of ambient scene light intensity equal to or higher than LV8 in daylight synchronized flash photography, the ambient light and the strobe light contributing to film exposure are substantially equal to 80 percent and 30 percent of the proper exposure, respectively. Although, in this case, 10 percent of the proper exposure is excessive so as to overexpose the film, it may be admitted that overexposed negative film is rather favorable because of the fact that it generally produces prints with good results. It is, of course, possible to select any ratio of ambient light and strobe light contributing to film exposure. In the case strobe is not used, the shutter is automatically controlled in such manner that the ambient light contributing to film exposure is 100 percent.

Under conditions of ambient scene light intensity between LV6 and LV8, because the shutter speed is maintained constant 1/32 sec., the ambient light contribution to film exposure decreases while the strobe light contribution to film exposure supplementarily increases as shown in FIG. 7. As a result of this, over-exposure of the film can be prevented. Furthermore, under conditions of ambient light intensity equal to or lower than LV6, the strobe light contribution to film exposure is 100 percent as in ordinary flash photography.

Figure 8:
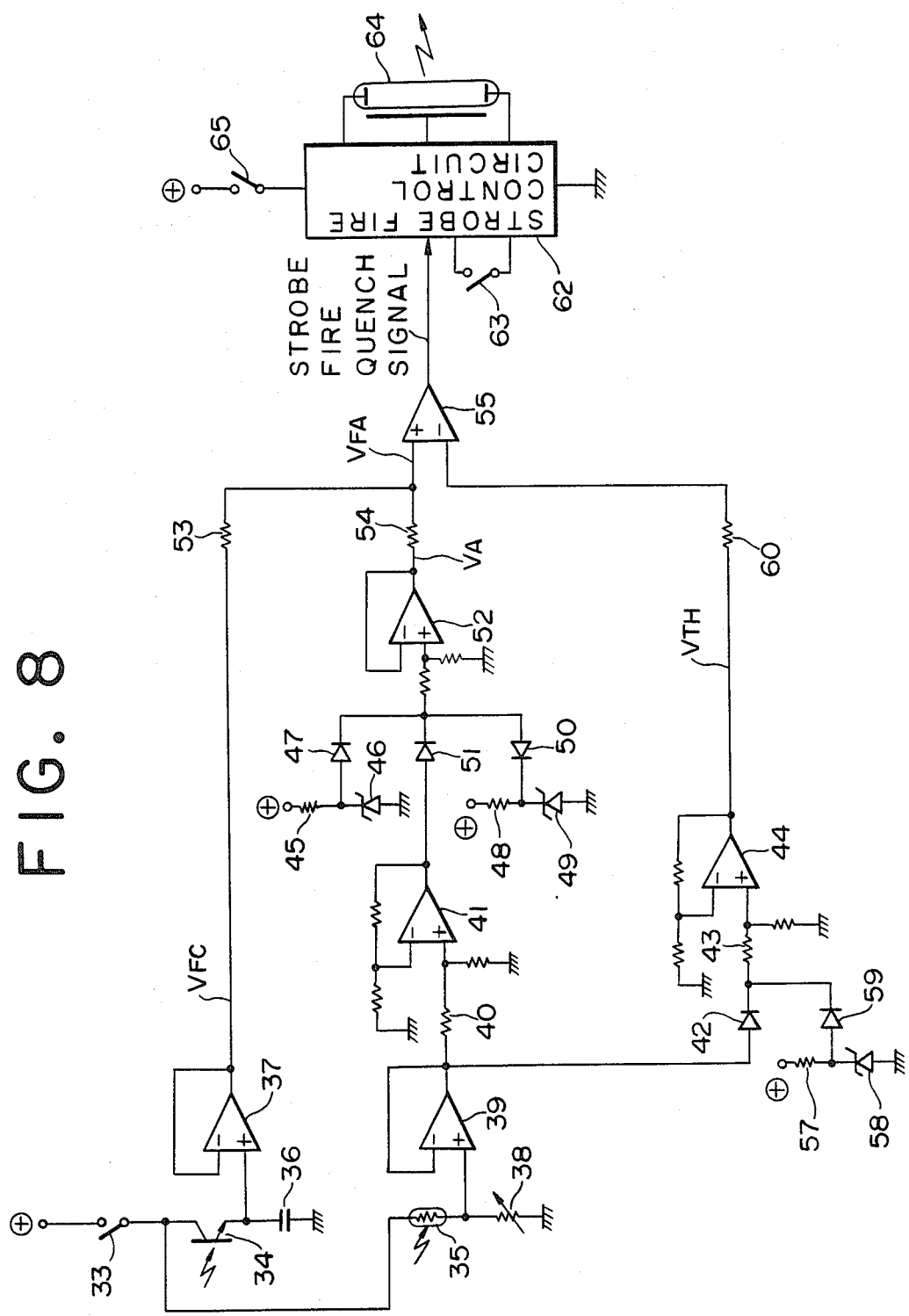
FIG. 8 is a circuit diagram showing the essential construction in detail of the aunomatic strobe apparatus of FIG. 3.

The operation of the automatic strobe apparatus is described in referrence to FIG. 8 showing a schematic circuit diagram of an embodiemnt of the present invention. The circuit includes a switch 33 which is turned ON at the same time the strobe is triggered to provide illumination light and turned OFF after the termination of the illumination light. Upon the turning ON of the switch 33, a phototransistor 34 and a phototransistor 34 are electrically energized. The photoresponsive element 35 operates to provide a current to be produced through a capacitor 36 in correspondence with the levels of strobe light incident thereupon. The capacitor 36 at the terminal then provides an output signal voltage VFC which, in turn, is directed to a buffer circuit 37.

The CdS photoresponsive element 35 which is connected in series to a variable resistor adjustable in accordance with film speed can provide output signal voltages in correspondence with the levels of the ambient scene light incident thereon. Signal voltage presented at the junction between the CdS photoresponsive element 35 and variable resistor 38 is directed to a buffer circuit 39 from which the output signal is directed to both an operational amplifier 41 of the type of a non-inversion amplifier through a resistor 40 and another operational amplifier 44 through a diode 42 and a resistor 43.

As seen centrally in FIG. 8, there is provided ambient light level setting means. The lower limit setting circuit comprises a resistor 45 and a Zener diode 46 in series connection and a diode 47 connected to the junction therebetween and the higher limit setting circuit comprises a resistor 48, a Zener diode 49 and a diode 50 each conncted in the same manner as the former. The output signal from the operational amplifier 41 between the lower and higher limit is permitted to be directed through a diode 51 to a buffer circuit 52. The buffer circuit 52 can provide the output signal VA having the characteristic shown in FIG. 5. The buffer circuits 37 and 52 are, respectively through resistors 53 and 54, connected to comparator 55 at its input terminal where the output signals VFC and VA are summed.

There is provided another lower limit setting circuit comprising a resistor 57, a Zener diode 58 and a diode 59 in the aforementioned manner. The diode 59 at the anode is connected to the diode 42 at the anode, which results in that the operational amplifier 44 selects higher one between the voltages presented at the anodes of the diodes 42 and 59 for amplification so as to provide the output signal VTH having the characteristic shown in FIG. 5. The output signal VTH from the operational amplifier 44 is directed through a resistor 60 to the aforementioned comparator 55 for comparison with the signal VFA which is the sum of the signals VFC and VA. At the time the signal VFA becomes larger than the signal VTH the comparator 55 provides a strobe fire quench signal which, in turn, is directed to a strobe fire control circuit 62.

Since the strobe fire control circuit 62 which operates to fire the discharge tube 64 in synchronism with the closing of a synchronozing switch 63 located in a camera and to quench the discharge tube 64 upon the provision of the strobe fire quench signal is wellknown in the art, the detailed construction thereof is omitted for simplicity. As is wellknown, the synchronizing switch 63 is adapted to close in synchronism with the commencement of the closing operation of a diaphragm shutter blade or with the arrival of the diaphragm shutter blade at the largest aperture size. A switch 65 seen directly above the strobe fire control circuit 62 is a power switch.

It should be noted that the rapid impression of voltage on the CdS photoresponsive element 35 upon closing the switch 33 produces no fluctuations in the output signal from the comparator 55 due to the fact that the comparator 55 at the negative terminal receives a constant voltage provided by the Zener diode 58. However, if desirable, the impression of the voltage on the CdS photoresponsive element 35 may be effected before the strobe is fired.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be constructed as included therein.

What is claimed is:

1. An automatic strobe apparatus used with a shutter of the type controlled in a programmed mode of operation wherein aperture size is automatically determined in correspondence with ambient scene illumination light level and for automatically controlling the amount of artificial light produced by the discharge tube thereof, said apparatus comprising:
    means for detecting the artificial strobe light reflected from the subject to be photographed;
    means for integrating the output signal provided by said artificial strobe light detecting means in synchronism with the commencement of said discharge tube firing to provide a first output signal;
    means for detecting the ambient illumination light level existing in the scene to be photographed;
    means for receiving the output signal from said ambient scene illumination light level detecting means so as to provide a second output signal in correspondence with the proportion of the ambient scene illumination light contributing to film exposure;
    means for summing said first and second output signals to provide a third output signal;
    means for receiving the output signal from said ambient scene illumination light level detecting means so as to provide a fourth output signal in correspondence with the programmed aperture size of said shutter;
    means for comparing said third output signal with said fourth output signal to provide a strobe fire quench signal when a predetermined relationship between the two is established; and
    means for terminating said discharge tube firing upon receiving said strobe fire quench signal.

2. An automatic strobe apparatus as defined in claim 1 wherein said second output signal provided by said means is steady independently of the level of ambient scene illumination light so as to maintain the proportion of artificial strobe light contributing to film exposure under conditions of the level of ambient scene illumination light intensity higher than the first level for the maximum exposure interval allowable for an exposure without incurring any adverse blurring effect from camera shake and under conditions of the level of ambient scene illumination light intensity lower than the second level for substantially no proportion of ambient scene illumination light contributing to film exposure when said maximum exposure interval is given, and is, on the other hand, variable under conditions of the level of ambient illumination light intensity between said first and second level so as to provide an increased amount of artificial strobe light for the compensation of the lack of the amount of ambient acene illumination light contributing to film exposure.

3. An automatic strobe apparatus as defined in claim 2 wherein said second output signal providing means comprises an amplifier for amplifying said output signal from said ambient scene illumination light level detecting means, a first diode connected in forward direction to the output terminal of said amplifier, a first constant-voltage circuit for providing a constant voltage higher than the maximum output voltage from said amplifier, a second constant-voltage circuit for providing a constant voltage lower than the maximum output voltage from said amplifier, a second diode with its anode and cathode connected respectively to said first constant-voltage circuit and the cathode of said first diode, and a third diode with its anode and cathode connected respectively to the cathode of said first diode and said second constant-voltage circuit.

4. An automatic strobe apparatus as defined in claim 3 wherein said artificial strobe light detecting means includes a phototransistor.

5. An automatic strobe apparatus as defined in claim 4 wherein said ambient scene illumination light level detecting means comprises a CdS photoresponsive element and a resistor in series connection.

6. An automatic strobe apparatus used with a shutter of the type controlled in a programmed mode of operation wherein aperture size is automatically adjusted in correspondence with the conditions of ambient scene illumination light level and for automatically controlling the amount of artificial light produced by the discharge tube thereof, said apparatus comprising:

means for detecting the illumination light from the scene to be photographed;

means for separating the output signal from said detecting means into the AC component of said output signal in correspondence with the artificial strobe light reflected from said scene and the DC component of said output signal in correspondence with the ambient scene light individually;

means for integrating said AC component of said output signal in synchronism with the commencement of the strobe firing to provide a first signal;

means for receiving said DC component of said output signal so as to provide a second signal in correspondence with the ambient scene light contributive to a film exposure;

means for summing said first and second signal to provide a third signals;

means for receiving said DC component of said output signal so as to provide a fourth signal in correspondence with the aperture size of said programmed shutter;

means for comparing said third signal with said fourth signal to provide a strobe fire quench signal when a predetermined relationship between the two is established; and means for terminating said discharge tube firing upon receiving said strobe fire quench signal.

* * * * *